UNITED STATES PATENT OFFICE.

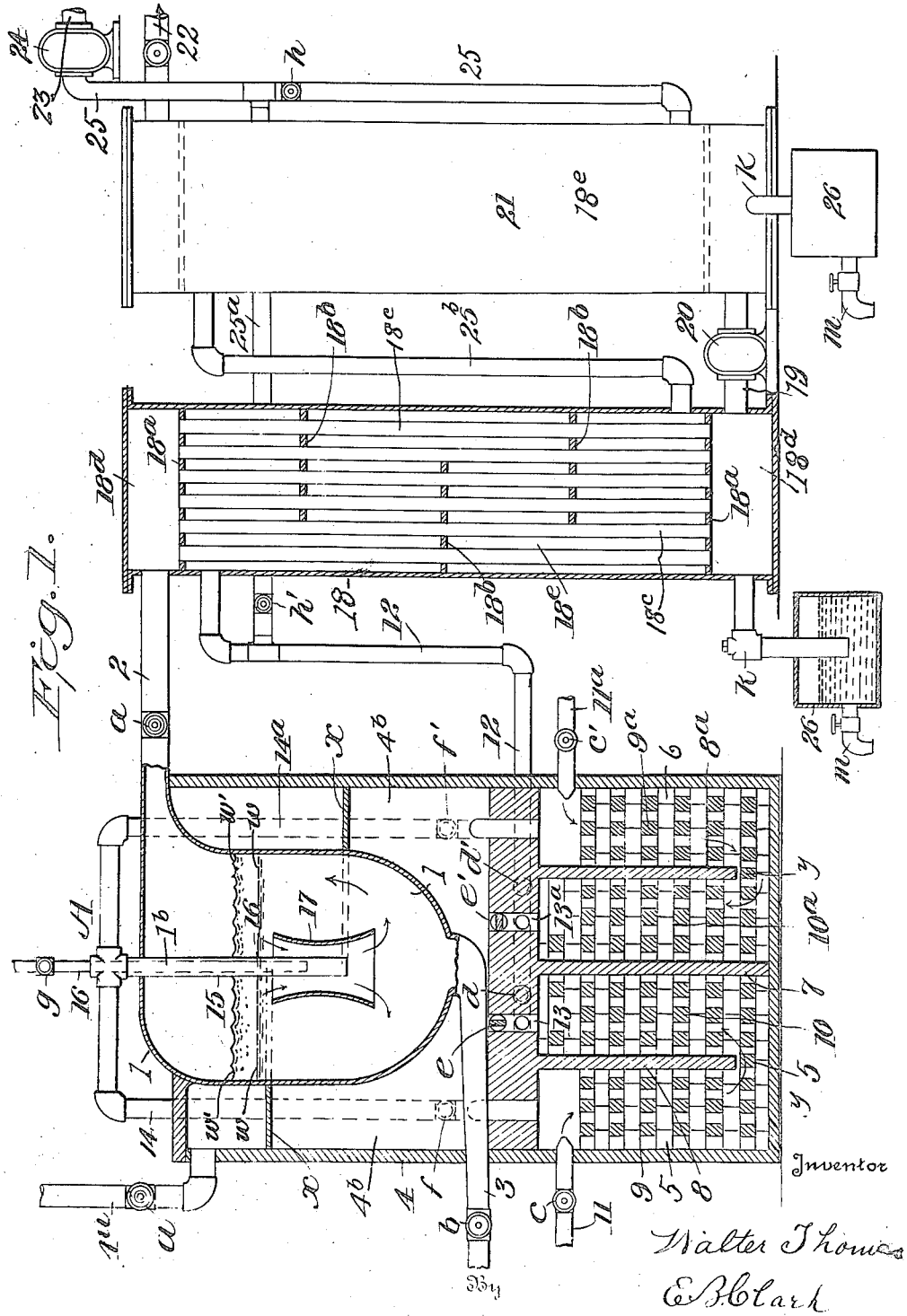

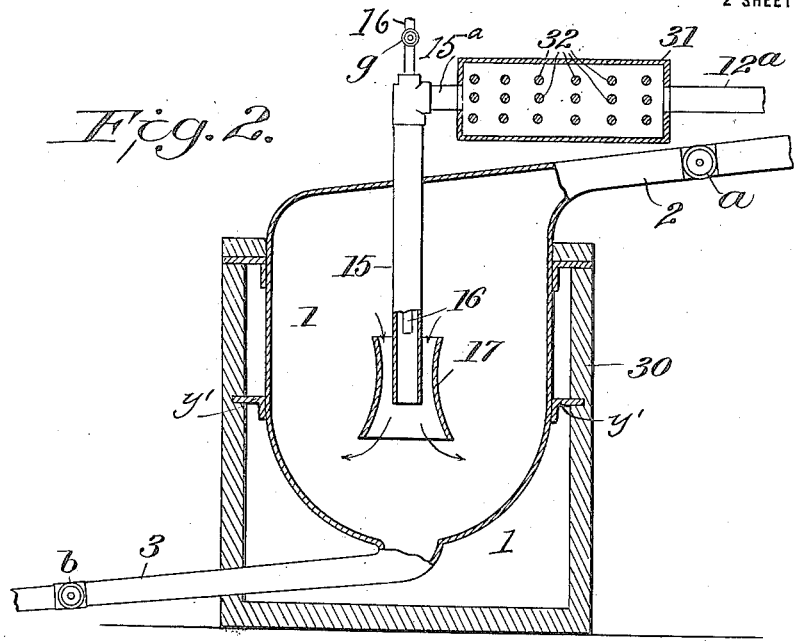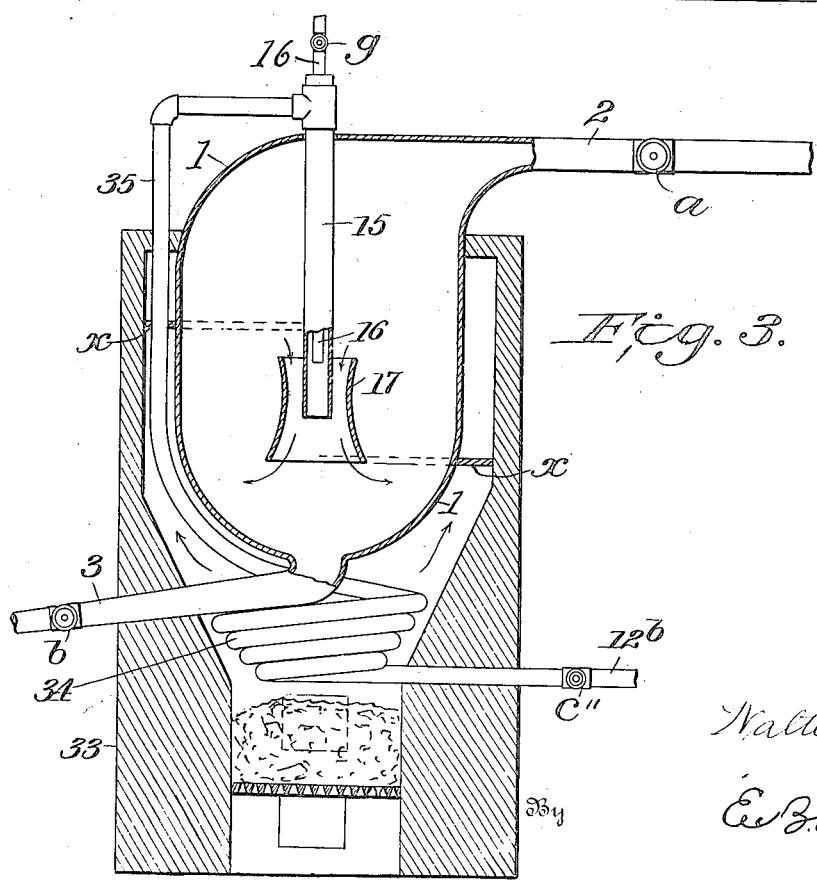

WALTER THOMAS, OF NANAIMO, BRITISH COLUMBIA, CANADA.

PROCESS OF AND APPARATUS FOR DISTILLING OIL AND OTHER LIQUIDS.

1,253,747. Specification of Letters Patent. Patented Jan. 15, 1918.

Application filed February 2, 1917. Serial No. 146,109.

*To all whom it may concern:*

Be it known that I, WALTER THOMAS, a subject of the King of Great Britain, residing at Nanaimo, British Columbia, Canada, have invented certain new and useful Improvements in Process of and Apparatus for Distilling Oil and other Liquids, of which the following is a specification.

This invention relates to a process and apparatus for distilling and vaporizing oil and other liquids.

The principal object of my invention is to provide for rapidly distilling and vaporizing mineral oils and other liquids by the direct application of hot gas or vapor in contact with the liquid and circulation of gas, vapor and liquid in the distilling chamber for more uniformly and rapidly causing vaporization and separation of the more volatile matters, either under exhaust or partial vacuum, or under pressure, according to the stage of the distillation and the product desired.

Another object is to provide for admitting the feed liquid and hot vapor or gas on the injector principle and causing their instant and rapid circulation through, and admixture with, the whole body of liquid under treatment and for drawing foam down into the body of liquid, so as to prevent boiling over and for obtaining more uniform and satisfactory products.

Another object is to provide for carrying off the separated gas and vapors by hot gas, condensing the vapor matter in the gas by means of cold lean gas, thereby heating the latter, and then passing the gas so heated into the body of liquid in the still, and thus continuously condensing the vapor matter, reheating the resulting lean gas and again circulating it through the liquid in the still for effecting economy in the operation.

The lean gas may be purified, if desired, before reheating, and returning to the still. The lean gas is also, preferably, additionally heated by passing through any desired kind of heating apparatus.

Another object is to provide an improved construction of apparatus, embracing an injecting and circulating device for gas, feed-liquid and hot liquid in the still for bringing the hot gas uniformly into contact with the whole body of liquid, and to prevent frothing or boiling over by drawing foam down into the liquid under treatment; also means for condensing the vapor matter from the carrying-gas and reheating the lean cool gas; also means for further heating the gas before admission to the injector-circulating device in the still.

The matter constituting my invention will be defined in the claims.

I will now describe my invention more in detail by reference to the accompanying drawings, in which—

Figure 1 represents a sectional elevation of one form of my apparatus, showing a regenerator gas heater.

Fig. 2 represents a sectional elevation of a modified construction showing an electric gas heater.

Fig. 3 represents a sectional elevation of a modification, showing a coil heater in a gas producer or other furnace and the still above.

The still 1 is made of plate iron or other metal and has a vapor escape or goose neck 2 provided with a valve $a$, and at the bottom a discharge pipe 3 having a valve $b$. The still is set and supported in the heating chamber $4^b$, in the furnace walls 4 rising from the regenerator stoves or chambers 5—6 at the base. A smoke stack $4^a$, having a valve $a'$ rises from the top of chamber $4^b$. Baffle plates $x$, $x$, may be placed in chamber $4^b$ for deflecting hot products in contact with the still. The regenerator chambers 5 and 6 are constructed of brick and filled with checker brick in a known manner. The two chambers are separated by a division wall 7 and each chamber is divided by an incomplete partition 8—$8^a$ into two compartments, as 9—10 and $9^a$—$10^a$. The partitions 8 and $8^a$ stop short of the bottoms of the chambers, leaving passages $y$—$y$ for the flow of gas from one compartment to the other. Oil burners 11 and $11^a$, having valves $c$—$c'$, connect respectively with the tops of the chambers 5 and 6. Injector oil burners of any known or convenient kind will be used, or gas may be burned.

A return gas pipe 12, for lean cold gas from a condenser or holder, connects by branches with the inlet and outlet pipes 13—$13^a$, connecting respectively with the compartments 10—$10^a$. The pipe 12 is provided with valves $d$—$d'$ and the branches connect below the valves $e$—$e'$ in pipes 13—$13^a$. These latter pipes serve alternately as inlets for cold gas to the chambers and as outlets for hot products of combustion which pass up around the still during the period of blowing or heating each of the chambers,—5—6. The pipes 13—$13^a$ connect respectively with the compartments 10—10ª and open into the chamber 4ᵇ, containing the still. Outlet pipes 14—14ª, having valves $f$—$f'$, connect respectively with the tops of compartments 9—9ª and extend up and connect with the injector inlet pipe 15, which extends down into the still. The pipe 15 projects into a double cone or flaring tube 17 located about centrally in the still and terminates at the contracted portion. The pipe and double cone form an injector-circulating device for gas and liquid. An oil or liquid feed pipe 16, having a valve $g$, is preferably arranged to pass down through the hot gas pipe 15 and terminate a short distance above its lower end as shown. The hot gas and feed liquid may be injected together. The liquid will thus be heated and discharged near the bottom of the still.

I preferably use two or more condensers for condensing the volatile matter carried by the gas, and have shown two double surface or tubular condensers, 18 and 21. The vapor outlet pipe 2 leads from the still to the upper chamber of condenser 18. This is constructed with upper and lower tube sheets 18ª which are connected by the tubes 18ᶜ, and form upper and lower chambers 18ᵈ and a large central chamber 18ᵉ. I preferably provide a number of baffle plates 18ᵇ, extending partly across the chamber 18ᵉ, for causing the incoming cold gas to take a circuitous course around the tubes. An outlet pipe 19 connects the bottom chamber 18ᵈ with an exhauster 20 which connects with the bottom chamber of the next condenser 21, having an outlet pipe 22 from its top chamber. An inlet pipe 23 for cold lean gas connects with a rotary blower, or other forcing device. The discharge pipe 25 from this blower connects with the bottom of the central chamber 18ᵉ of condenser 21. The pipe 25 has a valve $h$ and the branch 25ª has a valve $h'$ and may connect with the pipe 12 as shown, thus serving as a by-pass for gas when it is desired to force cold gas directly to the heater below the still. With the bottom chamber of each condenser is connected a seal box 26 by a pipe $k$ and each box has a faucet $m$, for drawing off liquid. A pipe 25ᵇ connects the upper part of the middle chamber 18ᵉ of condenser 21 with the lower part of chamber 18ᵉ in condenser 18.

Pipe 22 may connect with a gas holder, not here shown, and pipe 23 may lead from the holder. A store of cold gas is desirable. An initial supply of gas for starting the operation may be coal gas or a gas composed principally of hydrogen and carbon monoxid. Such gas is neutral and nonoxidizing and is a good carrier of rich condensable vapors. It is a lean gas. The gas remaining after condensation of vapors is also a lean gas in the sense used in this description.

Instead of heating the lean return gas in a regenerator stove as in Fig. 1, it may be heated in an electrically heated chamber 31 having a series of electrodes and heaters 32 as shown in the modification, Fig. 2. The still may be supported by brackets $y$ in a chamber 30 or in other desired manner. A return gas pipe 12ª supplies lean gas to the heater 31 and a pipe 15ª leads from the heater to the injector inlet pipe 15.

In another modified construction, Fig. 3, I provide a heating furnace or gas producer 33 in the fire chamber of which is supported a heating coil 34, supplied with lean gas by a pipe 12ᵇ, having a valve $c''$. A pipe 35 leads from the coil to the injector inlet pipe 15, as in Fig. 1.

It will be understood that the vapor outlet pipe 2 in these modifications will connect with one or more condensers, as in Fig. 1, and that the lean gas, after being heated in the condenser by the outgoing hot gas and vapor, will be returned, either to the electric heater chamber 31, or the coil heater 34 for utilizing waste heat and economizing in the operation.

The operation is very simple and may be conducted as follows:—With a regenerator stove or furnace in use, as shown in Fig. 1, the chambers are heated by burning either producer gas or mineral oil at the burners 11—11ª. If the chamber 5 is first heated the hot products of combustion will pass of through pipe 13—valve $e$ being open—into the heating chamber 4ᵇ around the still, which has been filled two thirds or three fourths its depth with oil or other liquid. In case of a liquid which has a tendency to foam much and boil over, I preferably fill the still with liquid approximately to the level indicated by the line $w$, Fig. 1, a short distance above the top of the double-cone tube 17, so that the layer of foam, indicated by $w'$, may be drawn with liquid down through said tube by a jet of gas under pressure and distributed and suppressed in the body of liquid. When vapors are given off the exhauster 20 will be started and will draw the vapors down through the tubes of the condenser 18 and discharge them into condenser 21. The checker brick in chamber 5 having been heated, valve $c$ of the burner and valve $e$ will be closed, valve $f$ opened, and valve $d$ opened. Cold lean gas from any desired source will now flow through the middle chambers, as 18ᵉ, of the condensers, thence through pipe 12 into compartment 10, through both compartments and thence by pipe 14 and injector pipe 15 into the double cone circulating device 17. The hot gas will be discharged under pressure from the pump 24 into the body of liquid and cause circulation thereof into the top of double cone 17 and out at the bottom thereof. The gas and liquid will be circulated together and intimately mixed, so that all parts of the liquid will be uniformly heated and agitated, causing it to give off its volatile portions. The hot gas and vapors will be continuously drawn off by the exhauster 20 and passed through the condensers. The gas, stripped of its volatile matter, may be stored in a holder and will be drawn therefrom by the pump 24 and forced through the middle chambers of the condensers and thence through the heating chamber to the still. While cold lean gas is being heated in chamber 5, the chamber 6 will be heated up and the hot products passed into chamber 4ᵇ, around the still. It will thus be understood that the liquid in the still is heated both externally and internally and is caused to circulate so as to be less liable to be burned or overheated at any part of the still.

Many liquids, such as oils, and especially tarry oils distilled from coal, peat and wood, have a tendency to froth and boil over, giving much trouble. By injecting gas and liquid down through the circulating device 17 this difficulty is overcome and a more uniform and perfect vaporization effected. The foam, indicated by $w'$, which collects on top of the liquid will be continuously sucked or drawn with liquid down through the injector circulating device 17 and broken down or suppressed in the body of liquid, thereby preventing boiling over. This has proved quite important and valuable in practice.

The use of cold lean gas to cool the hot gas and vapors and take up the heat therefrom and return it to the liquid in the still is a valuable economy in the operation.

Additional condensers may be used and they may be water cooled if necessary in order to obtain the desired condensation of all volatile condensable matter in the distillate. With the exhauster 20 runnning and the valve $a$ wide open the still will be running under low pressure, or partial vacuum, and the degree of exhaustion can be regulated by controlling the speed of the exhauster.

If desired, the valve $a$ in the vapor escape pipe 2 may be nearly closed so as to hold the vapor and liquid under pressure and increased heat, up to 400° to 600° F., for the purpose of cracking the oils and vapor into lighter fractions. If it is desired to convert the vapors into gas the heat will be increased accordingly. In that case the lean gas admitted to the still may be composed mostly of hydrogen and carbon monoxid, or of marsh gas.

With the apparatus shown in Fig. 2 in use, the lean gas will be continuously heated by passage through the electric heater 31. The operation in the stills and the condensers will be the same as previously described with reference to Fig. 1.

In the apparatus shown in Fig. 3 the lean gas passing from the condenser will be heated in the pipe coil 34 and passed thence through pipe 35 into the injector pipe 15 for carrying out the operation above described with reference to Fig. 1.

Having described my invention, what I claim, and desire to secure by Letters Patent, is 1. In the distillation of oil or other liquid, the method of expediting vaporization and preventing boiling over, which consists in heating the liquid, drawing liquid and foam down into a tubular circulating device and forcing them into the body of liquid by means of a jet of gas under pressure, and causing the liquid to circulate downward and upward, whereby any foam produced is suppressed in the downward flow of the liquid.

2. The process of distilling oil or liquid, which consists in heating a neutral or non-oxidizing gas, and injecting it down into a body of liquid and causing the gas and liquid to circulate together in intimate mixture downward and upward for expediting the vaporizing operation and for drawing foam down into the body of liquid so as to prevent boiling over.

3. The process of distilling oil or liquid, which consists in heating a neutral or non-oxidizing gas, and injecting same under pressure with fresh feed liquid in a combined jet into a body of liquid and causing the gas and liquid to circulate together in intimate mixture through a tubular circulator and body of the still and carrying off the resulting vapors with the gas and causing condensation of the vapor matter.

4. The process of distilling oil or liquids, which consists in heating a neutral or non-oxidizing gas, and injecting it into a body of liquid in a still and causing the hot gas and liquid to circulate together and intimately mix for expediting the vaporizing operation, carrying off the resulting vapor with the gas, causing condensation of the vapor matter, and cooling the gas, and by means of such cool gas cooling the hot gas and vapor and then passing the gas so warmed into the still and thus repeating the operation of distillation and condensation.

5. The combination with a still of means for heating gas, an injector circulating device in the still and a pipe connecting the gas heater with said device for injecting hot gas into the liquid and causing circulation of the gas and liquid together for expediting the vaporizing operation.

6. The combination with a still of means for heating gas, a flaring tubular device in the still, and a pipe connection from the heater extending down into said tubular device for injecting hot gas into the liquid and causing the two to circulate together and become intimately mixed for expediting the vaporizing operation.

7. The combination with a still of means for heating gas, an injector-circulating device in the still, a pipe connection from the heater to said device, a double surface condenser having means for passing hot gas and vapor in contact with one surface and cold gas in contact with the other surface and connections from said surfaces to and from the still.

8. The combination with a still and an injector-circulating device in the still, of a heating chamber containing the still, a regenerator stove or chamber below said heating chamber and the still, means for heating the regenerator, means for admitting gas to it to be heated, a pipe connection from the regenerator to said injector-circulating device, and a separate pipe connection from the regenerator to said heating chamber, whereby the still may be heated by waste hot products from the regenerator.

In testimony whereof I affix my signature in presence of two witnesses.

WALTER THOMAS.

Witnesses:
GEO. E. HARRIS,
E. MARSHALL.